No. 798,894. PATENTED SEPT. 5, 1905.
F. J. FEWINGS.
CAR AND ENGINE REPLACER.
APPLICATION FILED JUNE 1, 1905.
2 SHEETS—SHEET 1.
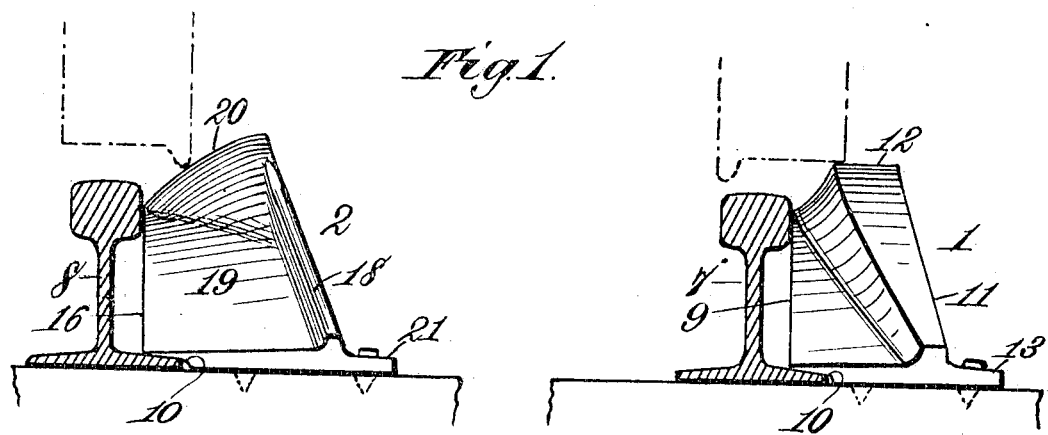
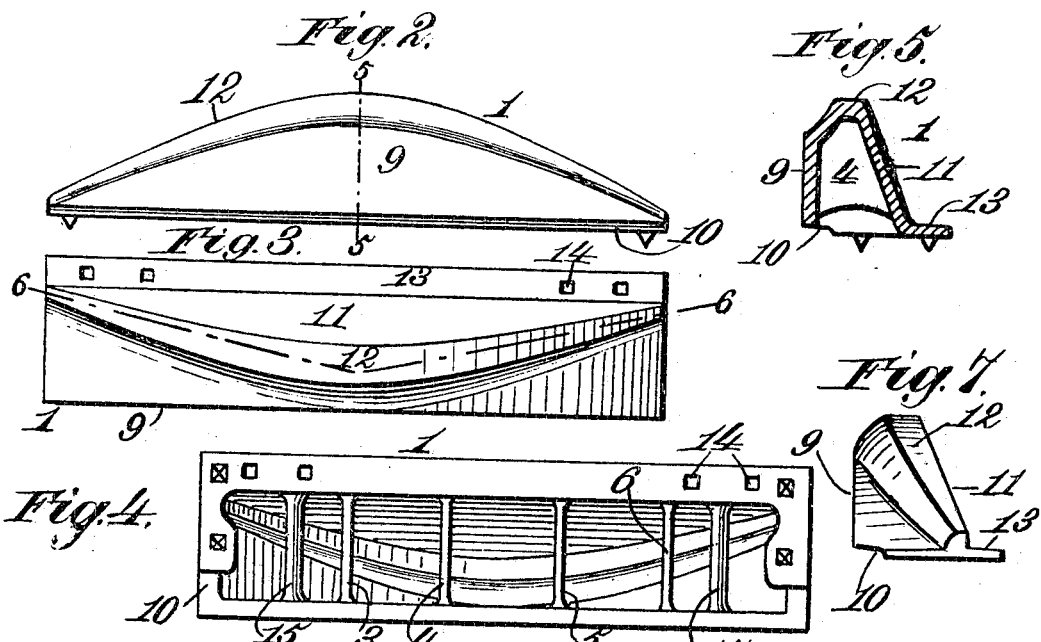
Witnesses.
Robert Everitt,
Dennis Sumby.
Inventor:
Frederick J. Fewings,
By James L. Norris,
Atty.

No. 798,894. PATENTED SEPT. 5, 1905.
F. J. FEWINGS.
CAR AND ENGINE REPLACER.
APPLICATION FILED JUNE 1, 1905.
2 SHEETS—SHEET 2.
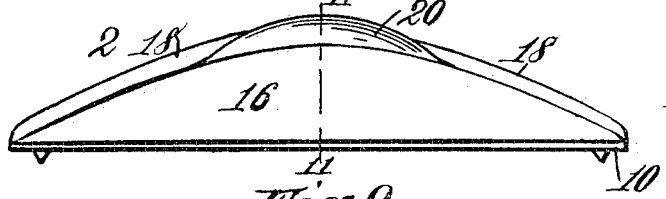
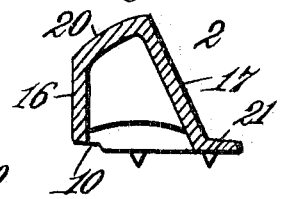
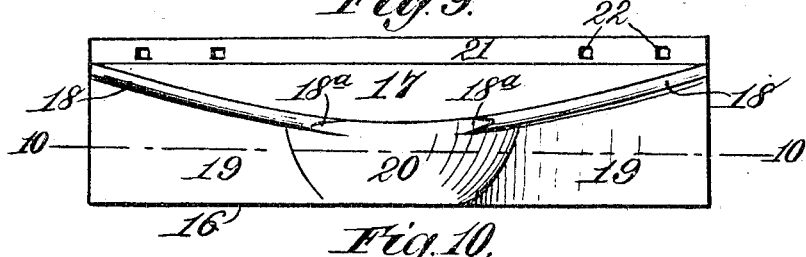
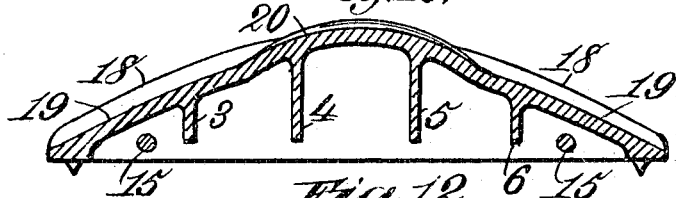
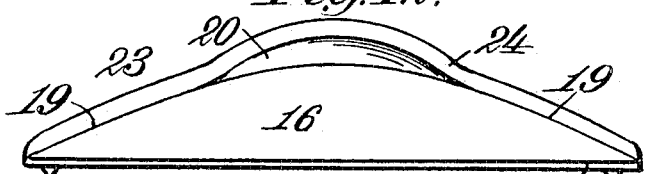
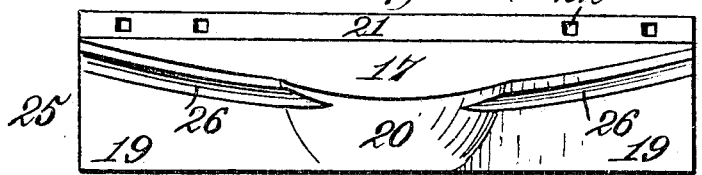
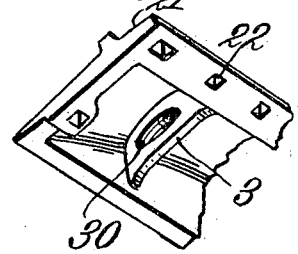
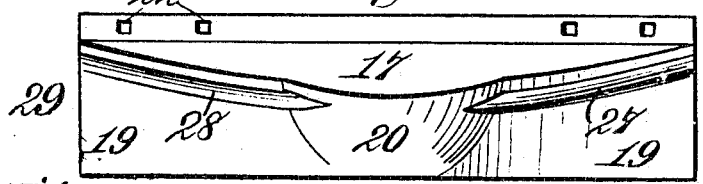
Witnesses.
Inventor:
Frederick J. Fewings,
By James L. Norris,
Atty.

UNITED STATES PATENT OFFICE.

FREDERICK J. FEWINGS, OF DULUTH, MINNESOTA.

CAR AND ENGINE REPLACER.

No. 798,894.  Specification of Letters Patent.  Patented Sept. 5, 1905.

Application filed June 1, 1905. Serial No. 263,274.

*To all whom it may concern:*

Be it known that I, FREDERICK J. FEWINGS, a citizen of the United States, residing at Duluth, in the county of St. Louis and State of Minnesota, have invented new and useful Improvements in Car and Engine Replacers, of which the following is a specification.

This invention relates to car and engine replacers; and the object thereof is to provide a car and engine replacer, hereinafter more specifically referred to, which will readily and efficiently replace a car or engine, whether it is run forward upon or back upon the replacer.

Primarily the invention resides in certain improvements hereinafter more specifically set forth upon the forms of car and engine replacers described and claimed in Letters Patent granted to me April 12, 1902, No. 706,542, and April 19, 1904, No. 757,604, and No. 792,977, June 20, 1905, and to this end the invention aims to provide a car or engine replacer which shall be simple in construction, having handholds so it can be easily handled by a person, strong, durable, light in weight, low height, suitable equilibrium when the load is on the upper portion because the point of application of the load is inside the center or the base of the replacer, efficient in its use, and comparatively inexpensive to manufacture.

With the foregoing and other objects in view the invention consists of the novel construction, combination, and arrangement of parts hereinafter more specifically described, illustrated in the accompanying drawings, and particularly pointed out in the claims hereunto appended.

In the drawings which form a part of this specification, and wherein like reference characters denote corresponding parts throughout the several views, Figure 1 is a sectional front elevation showing the replacer-blocks arranged with respect to the track-rail sections. Fig. 2 is a side elevation of the outer block. Fig. 3 is a top plan view of the outer block. Fig. 4 is an inverted plan of the outer block. Fig. 5 is a section on the line 5 5, Fig. 2. Fig. 6 is a section on the line 6 6 of Fig. 3. Fig. 7 is an end view of a modified form of outer block. Fig. 8 is a side elevation of the inner block. Fig. 9 is a top plan of the inner block. Fig. 10 is a section on the line 10 10 of Fig. 9. Fig. 11 is a section on line 11 11 of Fig. 8. Figs. 12, 13, and 14 are modified forms of inner blocks; and Fig. 15 is a portion of one of the blocks, showing a modified form of handhold.

Referring to the drawings, the outer block will be indicated by the reference character 1 and the inner block by the reference character 2. Both of these blocks are hollow, and each is formed of two side walls and a top wall integrally connected together. Each of the blocks is substantially segment-shaped in longitudinal section, and each of the blocks is strengthened through the medium of a plurality of transversely-disposed braces, as shown four in number; but the number of braces can be increased or diminished, as desired. These braces are indicated by the reference characters 3, 4, 5, and 6, and the said braces are formed integral with the inner face of the said side and top walls. In Fig. 1 of the drawings the outer block is shown in operative position with respect to the track-rail section 7, and the inner block is shown in operative position with respect to the track-rail section 8.

The outer block 1, as before stated, is hollow and substantially segment-shaped in longitudinal section, and the side wall thereof, which is arranged nearest the track-rail section 7, is termed the "inner" wall. This inner wall is indicated by the reference character 9. When the block 1 is in its operative position, it will fit upon the upper face of the base of the track-rail section 7. To enable the positioning of the block 1 in this manner, the lower face of the block 1 at its inner side is cut away, as at 10. The inner wall 9 is substantially segment shape and is formed integral with the top wall of the block 1, to be hereinafter referred to. The other, or what is termed the "outer" wall of the block 1, is indicated by the reference character 11. Said wall 11 is of much greater height than the wall 9, extends at an inclination toward said wall 9, is substantially bow shape in contour, as well as being substantially of convexed curvature longitudinally. The upper face of the wall 11 forms a bearing or working surface for the tread of the wheel, and said wall 11 also acts as a rib for guiding the wheel toward the track-rail section 7. Such action is obtained by extending the wall 11 above the top wall of the block 1 and having the central portion of said wall 11 arranged in close proximity to the track-rail section 7; but the height of said wall 11 at the center thereof is such that it extends above the track-rail section 7. The wall 11 as it rises toward the center from each end thereof gradually increases in width until the widest portion thereof at the center is of such width as to approximately equal half of the entire width of the block at its top. By such construction of the outer wall 11 the top of the block is provided with a gradually-increasing working or bearing surface which gradually rises from the end of the block to the center for the tread of the wheel.

The reference character 12 denotes the top wall of the block, which is segment-shaped in longitudinal section and is formed integral not only with the side wall 9, but also with the side wall 11. The upper face of the top wall 12 has a portion thereof of concaved curvature which rises toward the working surface formed by the outer wall 11, and the said curved portion of the upper surface of the top wall gradually increases in radii from the ends of the block toward the center thereof. The remaining portion of the upper surface of the top wall 12 is inwardly inclined, or rather is inclined toward the track-rail section and gradually decreases in width from the ends of the block toward the center thereof. The inclined portion of the upper surface of the top wall 12 merges at the outer side into the curved portion of gradually-increasing radii. The inclined portion of the upper surface of the top wall starts from the edge of the inner wall 9 and, as before stated, merges in the curved portion of said upper surface. The gradually-increasing curvilinear portion of the upper surface of the top wall 12 merges in the inner edge of the working surface formed by the outer wall 11. The gradually-increasing curvilinear portion of the upper surface of the top wall 12 also gradually increases in height toward the center of the block. This is evident owing to the fact that the wall 11 also increases in height toward the center of the block, and the said curvilinear portion of the upper surface of the top wall merges into the inner edge of the working surface formed by the wall 11. By constructing the upper surface of the top wall 12 in the manner as shown an additional working or bearing surface for the wheel is formed. Said surface has a tendency as the wheel rides thereover to throw the wheel toward the track-rail section.

The wall 11 terminates at its lower end in a laterally-extending flange 13, which is provided with a series of walled openings through which holdfast devices can be passed for securing the block to the ties, said openings 14 having the walls thereof formed only by the flange 13 and are separated from the wall 11, or, in other words, no portion of the vertically-extending part of the wall 11 forms any parts of the wall of the openings.

Each of the blocks 1 and 2 is provided with means to permit of the handling thereof by a person, and said means consists of a pair of transversely-extending bars 15, one of which is interposed between the brace 3 and one end of its respective block and the other of which is interposed between the brace 6 and the other end of its respective block. The transversely-extending bars 15 are formed integral with the inner face of the inner wall and the outer wall of their respective block.

The inner block 2, as before stated, is substantially segment-shaped in longitudinal section and is provided with what may be termed a "hump" of convexed curvature longitudinally as well as transversely, the hump inclining downwardly from the outer edge to the inner edge of the block 2, so as to throw the wheel toward the track-rail section. The said hump is formed by constructing what may be termed the "intermediate" portion of the block upon a smaller arc than the end portions of the block, the end portions of the block being substantially upon the same arc. That side wall of the inner block 2 which is arranged nearest the track-rail section 8 is indicated by the reference character 16 and is termed the "inner" wall, said wall being substantially segment-shaped in contour, so that the top edge thereof will extend in the arc of a circle. The side wall of the inner block 2 which is farthest away from the track-rail section 8 is termed the "outer" side wall 17 and extends toward the inner side wall 16 at an inclination and is of such height at each side of the hump as to provide a rib 18. Said ribs extend in a diagonal manner toward the wall 16, but in opposite directions with respect to each other, and at their upper ends terminate in the hump. These ribs act as guides for the wheel when mounting the block 2. By positioning the ribs at the extreme outer side of the block 2 a greater working surface for the wheel is obtained. The ribs 18 in some cases receive the ball of the wheel, and in such instances the weight would be distributed materially, and to permit of the ribs 18 receiving the ball of the wheel they are of such height that the ball of the wheel can rest on them. The upper ends of the ribs 18, which terminate in the hump, are not blunt, but are cut away, as at 18$^a$, forming at the point where they merge into the hump inclined flattened portions which facilitate the throwing of the ball of the wheel off the ribs as the wheel engages the hump and is thrown through the medium of the hump toward the track-rail section 8.

The top wall of the block 2 is indicated by the reference character 19 and has the intermediate portion, as well as the end portions thereof, formed in the arc of a circle; but the arc of the end portions is greater in radius than the arc of the intermediate portion. By constructing the top wall in the manner as stated the hump 20 of convexed curvature longitudinally as well as transversely is formed, said hump extending from one side edge to the other side edge of the block. The end portions of the top wall 19 are flat in transverse section, but the intermediate portion is inclined toward the inner side of the block. The end portions gradually rise toward and merge into the intermediate portion. The lower face of the block 2 at its inner side thereof is cut away so as to permit of the mounting of the block 2 upon the base of the track-rail section 8.

The wall 17 terminates at its bottom in a laterally-extending flange 21, which is provided with a series of walled openings 22, through which holdfast devices can be passed for securing the block to the ties, said openings 22 having the entire walls thereof formed only by the flange 21 and are separate from the wall 17.

In the modified construction shown in Fig. 12 the block is indicated by the reference character 23, and in lieu of employing the two ribs 18 shown in Fig. 8 but a single rib is employed, which extends from end to end of the block and is indicated by the reference character 24. Otherwise than that as stated the construction of the block is the same as shown in Figs. 8 and 9.

In the modified construction shown in Fig. 13 the block is indicated by the reference character 25, and in lieu of employing the ribs 18 the grooves 26 are used; but otherwise than that as stated the construction of the block is the same as that shown in Figs. 8 and 9.

In the modified construction shown in Fig. 14 a single rib 27 and a single groove 28 are employed. The block is indicated by the reference character 29. Otherwise than that as stated the construction of the block is the same as that shown in Figs. 8 and 9. The rib and the groove may be reversed, if desired.

In the modified construction shown in Fig. 15 the handholds are formed by providing the opening 30 in the braces 3 and 6. Otherwise the construction of the blocks is the same. In lieu of providing the braces 3 and 6 with the opening 30, but one of the braces may be provided with an opening and a transversely-extending bar arranged at the other end of the block to form a handhold.

By constructing the blocks in the manner as set forth, the wheels are prevented from passing completely over them, as the rib on the outer block and the ribs on the inner block guide the wheels and aid the sluing power of the incline, so there is but one place the wheels can go—namely, on the rails. The blocks are so constructed as to be capable of withstanding the weight of heavy locomotives and are yet light enough to be handled easily. The blocks are high enough to accomplish their work, but do not interfere in any manner with the underrigging of the cars or locomotives. The ascent of each of the blocks is gradual, yet the throwing power is sure. The blocks are adapted for use on bridges, trestles, curves, boarded walks, crossings, and frozen ground.

Having thus fully described my invention, what I claim as new, and desire to secure by Letters Patent, is—

1. A car and engine replacer comprising a replacer-block having a curved working surface with the intermediate portion thereof inclining toward one side of the block and of convexed curvature longitudinally and transversely, and ribs arranged at the outer side of the said working surface, one of said ribs arranged at one side of said intermediate portion and the other of said ribs arranged at the other side of said intermediate portion, said ribs at their upper ends merging into said intermediate portion.

2. A car and engine replacer comprising a replacer-block having a curved working surface with the intermediate portion thereof upon a smaller arc than the end portions, said end portions upon the same arc throughout.

3. A car and engine replacer comprising a replacer-block having a curved working surface with the intermediate portion thereof upon a smaller arc than the end portions, said end portions upon the same arc throughout, and a pair of ribs arranged at the outer side of the said working surface and merging at their upper ends into the sides of said intermediate portion.

4. A car and engine replacer comprising a replacer-block having a pair of working surfaces gradually rising toward the center, one of said surfaces gradually increasing in width toward the center thereof, the other of said surfaces having a portion thereof of substantially concaved curvature gradually increasing in radii toward the center thereof and its other portion inclined inwardly and gradually decreasing in width toward the center thereof.

5. A car and engine replacer comprising a replacer-block having its top formed with an inner and an outer working surface, said inner working surface curving downwardly from said outer working surface and having a portion thereof inclining toward the inner side of the block.

6. A car and engine replacer comprising a replacer-block having its top formed with an inner and an outer working surface, said inner working surface curving downwardly from said outer working surface, said outer surface gradually rising from both ends of the block and gradually increasing in width toward the center thereof and said inner surface gradually rising from both ends to the center of the block and having the curve thereof gradually increasing in radii toward the center of the block.

7. A hollow replacer-block having a transversely-extending bar at one end thereof forming a handhold, and means for forming a handhold at the other end of the block.

8. A hollow replacer-block having a transversely-extending bar at each end thereof forming a handhold.

9. A hollow replacer-block having a transversely-extending handhold-forming means integral with the inner face of the side walls of the block.

10. A hollow replacer-block having a curvilinear working surface, transversely-extending handhold-forming means arranged within the block and formed integrally with the inner face of the side walls thereof, and a laterally-extending flange projecting from one of the side walls of the block and provided with openings having the walls thereof formed entirely by the flange.

11. A hollow replacer-block having a transversely-extending bar at one end thereof forming a handhold, means at the other end of the block for forming a handhold, and a laterally-extending flange having openings with the walls thereof formed entirely by the flange.

12. A car and engine replacer comprising a replacer-block having a curved working surface with the intermediate portion thereof inclining toward one side of the block and of convexed curvature longitudinally and transversely, ribs arranged at the outer side of the said working surface, one of said ribs arranged at one side of said intermediate portion and the other of said ribs arranged at the other side of said intermediate portion, said ribs at their upper ends merging into said intermediate portion, transversely-extending handhold-forming means integral with the inner face of the side walls of the block, and a laterally-extending flange having openings with the walls thereof formed entirely by the said flange.

13. A car and engine replacer comprising a replacer-block having a curved working surface with the intermediate portion thereof upon a smaller arc than the end portions, said end portions upon the same arc throughout, transversely-extending handhold-forming means integral with the inner face of the side walls of the block, and a laterally-extending flange having openings with the walls thereof formed entirely by the said flange.

14. A car and engine replacer comprising a replacer-block having a curved working surface with the intermediate portion thereof upon a smaller arc than the end portions, said end portions upon the same arc throughout, a pair of ribs arranged at the outer side of the said working surface and merging at their upper ends into the sides of said intermediate portion, transversely-extending handhold-forming means integral with the inner face of the side walls of the block, and a laterally-extending flange having openings with the walls thereof formed entirely by the said flange.

15. A car and engine replacer comprising a replacer-block having a pair of working surfaces gradually rising toward the center, one of said surfaces gradually increasing in width toward the center thereof, the other of said surfaces having a portion thereof of substantially concaved curvature gradually increasing in radii toward the center thereof and its other portion inclined inwardly and gradually decreasing in width toward the center thereof, transversely-extending handhold-forming means integral with the inner face of the side walls of the block, and a laterally-extending flange having openings with the walls thereof formed entirely by said flange.

16. A car and engine replacer comprising a replacer-block having its top formed with an inner and an outer working surface, said inner working surface curving downwardly from said outer working surface, transversely-extending handhold-forming means integral with the inner face of the side walls of the block, and a laterally-extending flange having openings with the walls thereof formed entirely by the said flange.

17. A car and engine replacer comprising a replacer-block having its top formed with an inner and an outer working surface, said inner working surface curving downwardly from said outer working surface and having a portion thereof inclining toward the inner side of the block, transversely-extending handhold-forming means integral with the inner face of the side walls of the block, and a laterally-extending flange having openings with the walls thereof formed entirely by the said flange.

18. A car and engine replacer comprising a replacer-block having its top formed with an inner and an outer working surface, said inner working surface curving downwardly from said outer working surface, said outer surface gradually rising from both ends of the block and gradually increasing in width toward the center thereof and said inner surface gradually rising from both ends to the center of the block and having the curve thereof gradually increasing in radii toward the center of the block, transversely-extending handhold-forming means integral with the inner face of the side walls of the block, and a laterally-extending flange having openings with the walls thereof formed entirely by the said flange.

19. A replacer-block having transversely-extending bars integral with the inner faces of the side walls thereof for forming handholds.

20. A replacer-block having transversely-extending handhold-forming means integral with the inner face of the side walls of the said blocks.

21. A car and engine replacer comprising a replacer-block having a curved working surface with an intermediate portion thereof upon a smaller arc than the end portions, said intermediate portion extending from one side edge to the other side edge of the block.

In testimony whereof I have hereunto set my hand in presence of two subscribing witnesses.

FREDERICK J. FEWINGS.

Witnesses:
N. L. BOGAN,
JOHN L. FLETCHER.